United States Patent [19]

Tits et al.

[11] 4,083,910

[45] Apr. 11, 1978

[54] PROCESS FOR MOLDING PLASTIC ARTICLES

[75] Inventors: Hubert Tits, Kessel-Lo; Jean-Marie Losson, Bierges, both of Belgium

[73] Assignee: Solvay & Cie, Brussels, Belgium

[21] Appl. No.: 578,254

[22] Filed: May 16, 1975

[30] Foreign Application Priority Data

May 20, 1974  France .................. 74 17548

[51] Int. Cl.² .................... B29C 17/07; B29C 7/00
[52] U.S. Cl. ........................... 264/94; 264/318; 264/334; 425/442; 425/537; 425/541
[58] Field of Search .............. 264/89, 90, 92, 94, 264/96, 99, 318, 334; 425/DIG. 58, DIG. 205, DIG. 214, DIG. 232, 441–443, 450.1, 451, 451.1–451.7, 451.9

[56] References Cited

U.S. PATENT DOCUMENTS

| 3,753,641 | 8/1973 | Turner et al. .......... 425/DIG. 58 X |
| 3,840,317 | 10/1974 | Koch et al. ................. 425/451.6 |
| 3,848,042 | 11/1974 | Shelby ........................ 264/334 X |

Primary Examiner—Jan H. Silbaugh
Attorney, Agent, or Firm—Spencer & Kaye

[57] ABSTRACT

A mold composed of two half-molds arranged to undergo pivotal movement into a mold closing position, for molding an article having a reentrant portion extending to both sides of the plane of closure of the half-molds, is also arranged so that during pivotal movement out of the mold closing position one of the half-molds undergoes translational movement parallel to the plane of closure in order to release the reentrant portion of the article from the mold cavity.

4 Claims, 5 Drawing Figures

PROCESS FOR MOLDING PLASTIC ARTICLES

BACKGROUND OF THE INVENTION

The present invention relates to a process for molding plastic articles by means of molds formed by joining two half-molds, this process being particularly suitable for producing articles which possess a reentrant or concave part situated on either side of the plane of separation of the half-molds. The invention also relates to molds which are particularly suitable for carrying out this process.

Plastics are being used to an increasing extent for the manufacture of a multiplicity of hollow articles such as drinking cups, bottles, drums, barrels, storage tanks and other containers.

In order to manufacture these products, the technique of blow-molding is generally employed, although other techniques such as injection molding, or cold or hot shaping, can, in some cases, also prove to be very effective.

In order to mold these articles, molds are generally used which are formed by joining two half-molds, and, after molding and cooling, the half-molds are separated from one another in order to make it possible to release the resulting article from the mold.

Some of these hollow articles, and this is true, for example, for many types of bottles, must, for reasons of mechanical strength, possess reentrant parts and, in particular, reentrant bases, that is to say bases which are concave towards the inside of the hollow article. These reentrant parts are frequently situated, as in the case of reentrant bases, on either side of the plane corresponding to the plane of separation of the half-molds in the axis of the mold.

If conventional molds are used to manufacture this type of article, it is found that when the half-mold or half-molds shift as the mold is being opened, they damage these reentrant parts and in some cases even tear them.

In order to make it possible to manufacture hollow articles possessing reentrant bases with a deep hollow, it has consequently been proposed to make use of improved molds composed of base parts which can be separated from the parts forming the body, and mechanisms have been developed for controlling the axial shift of the base parts prior to opening the body parts in order to make it possible to release the reentrant parts completely.

These molds and their control mechanism, however, require a substantial increase in the cost of the molding installations and make the latter more delicate. Moreover, these means make it necessary for a free space to exist underneath the base of the molds so as to permit the axial release of the parts forming the bases of the molds. This restriction makes it impossible to manufacture these articles in rotary machines equipped with molds which are practically touching and which are mounted on the periphery of a rotating plate or some other rotating support, and thus to benefit from the high productivity inherent in installations of this type.

It would consequently appear that it has hitherto not been possible to satisfactorily manufacture hollow articles and other articles possessing reentrant parts as defined above.

SUMMARY OF THE INVENTION

It is an object of the present invention to provide a molding process which is completely satisfactory for molding these articles and which makes it possible, especially, to manufacture them on rotating installations equipped with molds which are practically contiguous, or touching.

This and other objects of the invention are achieved, in a process for molding plastic articles possessing a reentrant part in a mold formed by joining two half-molds, the reentrant part being situated on either side of the closure plane of the mold, by causing the opening movement of at least one of the half-molds to include a translational component along a direction parallel to the closure plane of the mold, making it possible to release the reentrant part of the article before the mold has been completely opened.

In other words, the separating movement of the half-molds which leads to the opening of the mold includes a translational movement which moves the reentrant part of the shaped article away from the constitutent parts of the mold which shaped it.

According to a preferred embodiment, the translational movement is effected along a direction parallel to the axis of the mold.

When the process according to the invention is being employed, use is preferably made of molds consisting of two half-molds, only one of which can move relative to the closure plane, the mold being opened either by a lateral translational movement of the mobile half-mold along a direction perpendicular to the closure plane of the mold, or by a rotational movement of this half-mold about an axis parallel to the closure plane.

It is, however, intended that the process according to the invention can also be applied when the two half-molds can move relative to one another or when they shift in accordance with any other movement.

Since the majority of hollow articles possess parts in relief, such as, for example, thread cuttings, ribs, rims and the like, it is not generally possible to cause the half-molds to effect the translational movement in accordance with the process of the invention from the start of the opening movement of the mold. For this reason, it is preferred that the translational movement be brought about only after the mold has been partially opened so as to release firstly all the uneven portions of the outer surface of the shaped article. It is true that, during this partial opening movement, the reentrant part of the shaped article can be slightly deformed by the walls of the impression of the mold, but this temporary deformation must not exceed the elastic limit of the material of which the article is made, and consequently has no permanent effect on the final appearance of the reentrant part of the article.

It is obvious that the amplitude of the translational movement brought about in accordance with the process of the invention must be chosen in relation to the depth of the reentrant part so as to make it possible for this part to be completely released. Moreover, the greater the slope of the reentrant part, the more rapid must be this translational movement, relative to the opening movement of the mold.

The process according to the invention can be employed in all the techniques for processing plastics which use molds consisting of two half-molds, but it finds its most valuable application in blow-molding techniques.

Likewise, the process according to the invention can also be applied in the manufacture of solid articles with a dense or cellular structure.

When the process according to the invention is applied, it is obvious that, during closing of the mold, the half-mold or half-molds should follow a trajectory which brings them back into the correct position for reforming the mold.

The translational movement brought about when the mold is opened can be achieved by numerous mechanical means such as, for example guiding slide-bars, profiled cams, and the like, which act on the half-mold or half-molds.

In order to carry out the process according to the invention, the invention also provides novel mold structures.

These molds consist of two half-molds linked to one another by a hinge device and are equipped with means for causing at least one of the half-molds to pivot about the hinge for the purpose of periodically opening and closing the molds. These molds differ from the molds of this type used hitherto in that they are equipped with means which cause at least one of the half-molds to effect, when the mold is being opened, a simultaneous translational movement along a direction parallel to the closure plane of the mold so as to permit the release of the reentrant part of the shaped article.

This translational movement is preferably effected along a direction parallel to the axis of the mold, and thus to that of the hinge.

As a further preference, the means which bring about the desired translational movement of the mobile half-mold or half-molds when they pivot about the hinge are designed in such a way that this translational movement is brought about only after the mold has been partially opened.

Any means whatsoever can be used to bring about the desired translational movement, and the satisfactory operation of such means can be controlled by mechanical, pneumatic, hydraulic or electric means. It is preferred, however, to employ mechanical controls based on the use of cams profiled in a suitable manner.

According to the preferred embodiment of the invention, the molds consist of a fixed half-mold and mobile half-mold which can pivot on the fixed half-mold, and the molds thus formed open and close like a book by pivoting the mobile half-mold about the fixed half-mold. In this case, the mobile half-mold is equipped with means which cause it to effect the desired translational movement as it pivots.

According to a first modified form of construction of molds of this type, the hinge which links the half-molds can itself be equipped with a cam wedged on its pivoting axle and profiled so as to cause the arm of the hinge supporting the mobile half-mold to effect, when this half-mold pivots, a translational movement along a direction parallel to the pivoting axis of the hinge. In this case, the reverse translational movement which is necessary, when the mold is closed, in order to bring the two half-molds back opposite one another, can be brought about by a system composed of return springs or by a counter-cam which is also wedged on the pivoting axle of the hinge.

The cam which brings about the axial translational movement of the mobile half-mold when the mold is being opened is preferably designed so that its effect on the translational movement of the half-mold commences only after the mold has been partially opened.

According to another preferred form of construction, the mobile half-mold is mounted so as to be able to slide in the arm of the link hinge which supports it and to do so in a direction parallel to the closure plane of the mold, and the sliding movement of the mobile half-mold, when the mold is being opened and closed, is controlled by a system including a profiled cam which is firmly attached to the fixed half-mold and which acts on a roller firmly attached to the mobile half-mold, and by return springs.

This type of mold can be produced in two specific embodiments.

According to a first embodiment, the cam and the return springs are arranged so that the translational movement of the mobile half-mold is brought about, when the mold is being opened, by the action of the cam in opposition to the action of the return springs, and, when the mold is being closed, by the return springs under the control of the cam.

According to the second embodiment, the cam and the return springs are arranged so that the translational movement of the mobile half-mold, when the mold is being opened, is brought about by the action of the return springs, and is controlled by the cam, while, when the mold is being closed, the translational movement of the mobile half-mold is controlled and checked by the cam in opposition to the action of the return springs.

The process according to the present invention, as well as the molds which are suitable for carrying out the process, are, moreover, described in a more detailed manner in the description which now follows of several different practical embodiments. It is to be understood, however, that these descriptions, which are given purely by way of illustration, do not in any way limit the scope of the present invention.

DESCRIPTION OF THE PREFERRED EMBODIMENTS

Figures 1, 2:
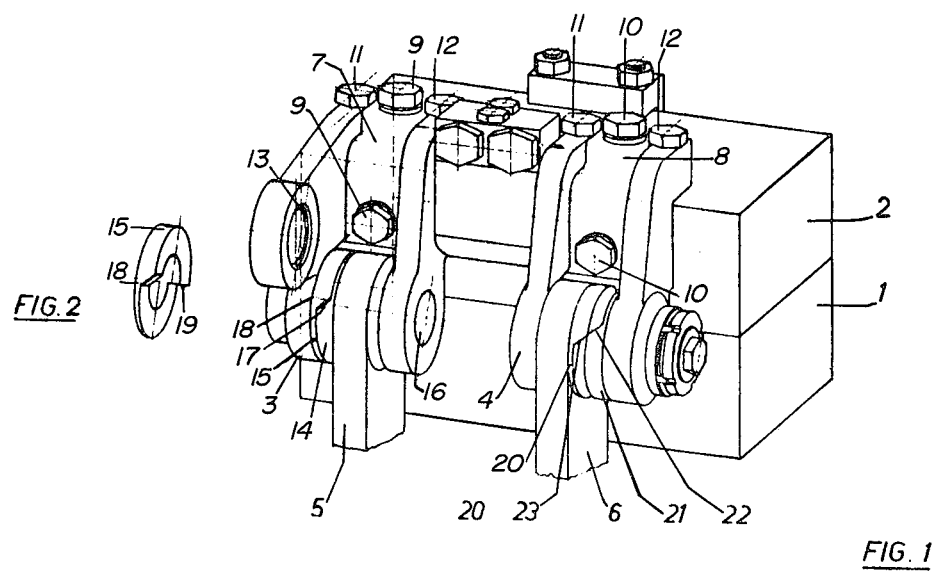
FIG. 1 is a perspective view of a mold according to, and suitable for carrying out one embodiment of the process according to, the invention.
FIG. 2 is a perspective view of the control cam of the mold of FIG. 1.

A first practical embodiment according to the invention is shown in FIGS. 1 and 2 to be constituted by a mold having a fixed, or stationary, half-mold 1 and a mobile half-mold 2 which are linked to one another by two hinges 3 and 4. The fixed half-mold 1 is firmly attached to the arms 5 and 6 of the hinges, these arms also being fixed. The mobile half-mold 2 is mounted on the arms 7 and 8 of the hinges by means of attachment screws 9 and 10 and adjustment screws 11 and 12. The arm 7 of the hinge also possesses a bushing 13 to which there is connected the control, not illustrated, which opens and closes the mold by pivoting the entire mobile half-mold 2 about the hinges 3 and 4.

The fixed hinge arm 5 possesses a profiled cam 14 which is also fixed, while a control cam 15, which is also profiled and annular, is wedged on the pivoting axle 16 of the hinge 3. The fixed cam 14 possesses a part 17 with a sloping profile, the profile of which is calculated in relation to the amplitude of the desired translational movement, this amplitude being equal to the height of the slope. Moreover, the angle of slope of this part of the cam determines the rate of this translational movement. The cam 15 also possesses a part 18 with a sloping profile identical to that of the cam 14. One of the two cams is wedged on the hinge arm 5 and the other is wedged on the pivoting axle 16 of the hinge in such a way that their sloping parts face one another and that, when the mold is closed as represented in FIG. 1, the parts with sloping profiles of the two cams are spaced slightly apart. These two cams also possess stops 19 which are in contact when the mold is closed.

The fixed arm 6 of the hinge 4 also possesses a profiled annular cam 20 which is fixed, while a profiled cam 21, which is also annular, is wedged on the pivoting axle of the hinge 4. Each of these cams possesses a respective part with a sloping profile, 22 or 23, which parts face one another and which are identical to those provided on the cams 14 and 15. However, in the closed mold position, as represented in FIG. 1, the sloping parts 22 and 23 of the cams 20 and 21 are opposite one another but are spaced apart by a distance equal to the desired amplitude of the translational movement of the mobile half-mold.

The way in which the mold thus described operates is very simple and can practically be deduced from examining FIG. 1.

Thus, when the mold is in the closed position, all its constitutent elements are in the position illustrated in FIG. 1.

As soon as the mold begins to open, under the action of the control mechanism (which is not represented), the mobile half-mold 2 commences its pivoting movement and the sloping profile parts 17 and 18 of the cams 14 and 15 move closer to one another. Until the sloping parts come into contact, the mobile half-mold 2 undergoes only a pivoting movement about the hinges, and this makes it possible to release the parts of the molded article which are in relief from the impression of the mobile half-mold.

As soon as the parts with sloping profiles 17 and 18 of the cams 14 and 15 come into contact, the slipping movement of one over the other causes a transverse shift of the hinge arm 7 towards the left, with respect to the direction of the view of FIG. 1, along a direction parallel to the pivoting axis of the hinge. As a result of this, as long as the sloping parts 17 and 18 are in contact, the pivoting movement of the mobile half-mold 2 is accompanied by a translational movement which makes it possible gradually to release the reentrant parts of the molded article completely from the impression of the mobile half-mold 2.

When the sloping parts 17 and 18 cease to be in contact, the mold continues to open due to simple pivoting of the mobile half-mold 2 and, when the opening process is complete, the molded article can be removed easily from the impression of the fixed half-mold 1.

It is also clear that a second result of the separation created between cams 14 and 15 by the slipping of the sloping profile part of one over the other, is to move the cam 21 proportionately closer to the cam 20, so that finally these cams are in close contact.

As a result of this, when the mold is closed by pivoting the mobile half-mold 2, the sloping parts 22 and 23 of the cams 20 and 21 come into contact and their subsequent slipping movement over one another has the effect of bringing about the translational movement of the mobile half-mold 2 towards the right (FIG. 1) and of bringing it back opposite the fixed half-mold at the instant when the mold is closed.

Figures 3, 4:
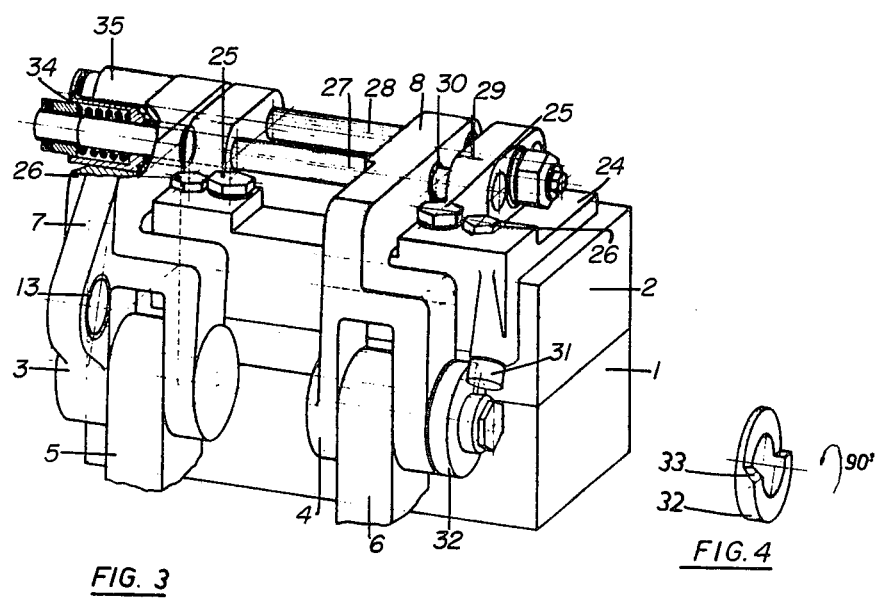
FIG. 3 is a perspective view, in partial cross section, of a mold according to, and suitable for carrying out another embodiment of the process according to, the invention.
FIG. 4 is a perspective view of the control cam of the mold of FIG. 3, the cam having been rotated through 90° from the position shown in FIG. 3 so that its details will be more apparent.

According to another practical embodiment, illustrated in FIGS. 3 and 4, the mold according to the invention also consists of a fixed half-mold 1 and a mobile half-mold 2 which are linked to one another by two hinges 3 and 4. The fixed half-mold 1 is again firmly attached to the arms 5 and 6 of the hinges, these arms being fixed. The mobile half-mold is fixed in a small plate with a right-angled bend 24 by means of attachment screws 25 and adjustment screws 26, the small plate being itself wedged on axles 27 and 28 which can slide in bushings 29 and 30 provided on the arms 7 and 8 of the hinges 3 and 4. The small plate 24 also possesses a control roller 31 which rests on a profiled annular cam 32 wedged on the pivoting axle of the hinge 4, this cam being fixed. As can be seen in FIG. 4, this cam possesses a part with a sloping profile 33, the height of this slope corresponding to the amplitude desired for the translational movement of the mobile half-mold and the angle of this slope being the greater, the more rapid the translational movement has to be. When the mold is closed, the control roller 31 is slightly set back from the part with a sloping profile 33 of the fixed cam 32.

Moreover, return springs 34 and 35 exert traction on the axles 27 and 28 and consequently hold the control roller 31 against the surface of the fixed annular cam 32.

Finally, the arm 7 of the hinge 3 carries a bushing 13 which makes it possible to connect the mechanism, which is not represented, for controlling the opening and closing of the mold.

The way in which the mold thus formed operates is very simple and can practically be deduced from examining FIG. 3.

When the mold is in the closed position, all its constitutent elements are in the position illustrated in FIG. 3.

As soon as the mold begins to open, under the action of the control mechanism which is not represented, the mobile half-mold commences its pivoting movement and the control roller 31, slipping in contact with the fixed cam 32, moves closer to the sloping profile part 33 of this cam. Until this roller reaches this sloping part, the half-mold 2 carries out only a pivoting movement about the hinges and this makes it possible to release the parts of the molded article which are in relief from the impression of the mobile half-mold.

As soon as the roller 31 encounters the sloping part 33 of the fixed cam 32, this part of the cam pushes the roller towards the right (FIG. 3) and consequently the mobile half-mold 2 carries out, in addition to its pivoting movement, an axial translational movement towards the right since it is firmly attached to the roller 31. This translational movement of the mobile half-mold, which takes place in opposition to the action of the return springs 34 and 35, makes it possible gradually to release the reentrant parts of the molded article completely from the impression of the mobile half-mold.

When the roller 31 has passed beyond the part with a sloping profile 33 of the cam 32, the mold continues to open due to simple pivoting of the mobile half-mold 2, and when the opening process is complete, the molded article can be removed easily from the impression of the fixed half-mold 1.

After removing the molded article, the mold can be reclosed. This closing operation takes place first of all due to simple pivoting of the mobile half-mold 2 until the instant when the roller 31 again takes up a position at the start of the sloping part 33 of the cam 32. From this instant onwards, under the action of the return springs, the half-mold 2 also carries out a translational movement which is controlled by the profile of the cam 32 and which brings it back gradually opposite the fixed half-mold 1. When the roller 31 has passed beyond the profiled part of the cam 32, the half-molds are opposite one another and complete closure of the mold can be continued by simply pivoting the mobile half-mold.

When this type of mold is used, the return springs 34 and 35 must be chosen carefully so as to ensure that the half-molds are indeed opposite one another at the instant when the mold is closed.

It is very obvious that, if so desired, the axles 27 and 28 can have a direction which is not parallel to the pivoting axis of the mold, while remaining parallel to the closure plane of the mold.

Figure 5:
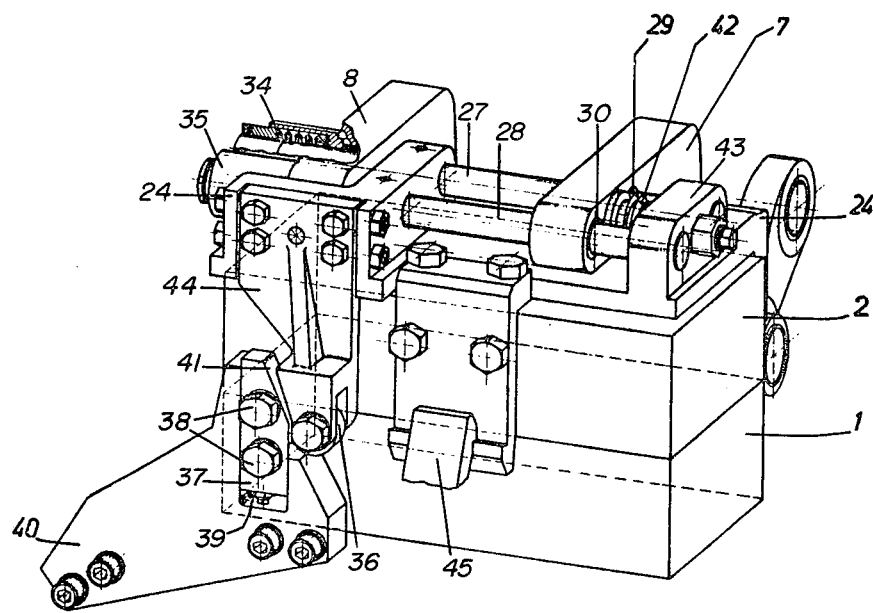
FIG. 5 is a perspective view, in partial cross section, of a mold according to, and suitable for carrying out another embodiment of the process according to the invention.

A last practical embodiment illustrated in FIG. 5 is a mold very similar to that illustrated in FIG. 3. The mold of FIG. 5 consists of a fixed half-mold 1 and a mobile half-mold 2 linked to one another by hinges. The mobile half-mold 2 is fixed in a small plate with a right-angled bend 24 which is itself wedged on two axles 27 and 28 which can slide in bushings 29 and 30 provided on the mobile arms 7 and 8 of the hinges. The small plate 24 also carries a control roller 36 which rests against a cam 37 with a trapezoidal profile. This cam is equipped with attachment screws 38 and adjustment screws 39 which hold it in an attachment component 40 which is firmly attached to the fixed half-mold 1. The cam 37 possesses an inclined portion 41 and, in the closed mold position, the roller 36 is slightly set back from this inclined portion of the cam 37.

The return springs 34 and 35 exert tension on the axles 27 and 28 and consequently hold the control roller 36 against the cam 37.

Moreover, an adjustable stop 42 is mounted in the support 43 of the small plate 24.

Finally, the support 44 of the roller 36 is fixed in the small plate 24 by attachment and adjustment screws.

The mold shown in FIG. 5 also possesses a locking device 45 which locks the mold in the closed position and which is unlocked prior to opening the mold.

The mold thus formed operates in the following way.

When the mold is in the closed position, all its constituent elements are in the position illustrated in FIG. 5.

When, after unlocking, the mold begins to open under the action of its control mechanism, which is not represented, the mobile half-mold commences its pivoting movement and the control roller 36, slipping in contact with the fixed cam 37, moves closer to the sloping part 41 of this cam.

Until this roller reaches this sloping part, the half-mold 2 carries out only a pivoting movement about the hinges and this makes it possible to release the parts of the molded article which are in relief, from the impression of the mobile half-mold.

As soon as the roller 36 reaches the sloping part of the cam 37, the return springs 34 and 35 cause this roller to follow the profile of this slope and, as a result of this, the mobile half-mold 2 carries out, in addition to its pivoting movement, an axial translational movement at a rate which depends on the slope given to the sloping part 41 of the cam 37. It is obvious that the cam 37 is positioned in such a way that, under the effect of the pivoting movement of the mobile half-mold, the roller 36 cannot escape from the cam. This translational movement of the half-mold, which makes it possible to release the reentrant parts of the molded article, continues until the instant when the stop 42 encounters the arm 7 of the hinge. From this instant onwards, the mold continues to open, due only to its pivoting movement.

When the mold is being closed, the half-mold 2 pivots about the hinges until the instant when the control roller 36 comes into contact with the inclined portion 41 of the cam 37. From this instant onwards, the cam 37 forces the half-mold to effect an axial translational movement which is combined with its pivoting movement and brings the mobile half-mold back into the correct position for closing it completely and locking it.

When this type of mold is used, it is certain that the mobile half-mold will return to the correct position since it is controlled by the cam 37 in opposition to the action of the return springs 34 and 35.

In this case also, it is not absolutely necessary that the axles 27 and 28 should be parallel to the pivoting axis of the mobile half-mold.

The process according to the invention and the molds developed for carrying it out prove to be particularly valuable for the manufacture of hollow articles with a reentrant base by blow-molding on a rotating machine with a horizontal axis. In this case, in fact, the fixed half-molds are aligned one after the other on a rotating support so as to form the sides of a polygon. As a result of this, the mobile half-molds are spaced apart angularly and consequently sufficient space is available to enable them to effect their translational movement when the molds are being opened.

It will be understood that the above description of the present invention is susceptible to various modifications, changes and adaptations, and the same are intended to be comprehended within the meaning and range of equivalents of the appended claims.

We claim:

1. In a process for molding plastic articles possessing a reentrant part wherein a mold is formed by bringing two half-molds together, a molding operation is carried out in the mold, and the mold is opened to release the molded article, the reentrant part of the article extending across the closure plane of the mold, the improvement wherein the opening of the mold at the completion of the molding operation is carried out by causing the entirety of one of the half-molds to undergo a pivoting movement away from the other half-mold accompanied by a translational movement along a direction parallel to the closure plane of the mold, permitting release of the reentrant part of the article before the mold has been completely opened.

2. Process according to claim 1 wherein the translational movement component is effected along a direction parallel to the axis of the mold.

3. Process according to claim 1 wherein the translational movement component is brought about after the mold has been partially opened.

4. Process according to claim 1 in which the plastic articles are produced by the technique of blow-molding.

* * * * *